United States Patent [19]

Serratore et al.

[11] 4,058,495
[45] Nov. 15, 1977

[54] PREPARATION OF HIGH BULK DENSITY/LOW POROSITY PVC RESINS

[75] Inventors: Joseph Serratore, Sarnia; Laurence F. King, Mooretown; Thomas H. Sutherland, Sarnia; James R. Wallace, Camlachie, all of Canada

[73] Assignee: Exxon Research & Engineering Co., Linden, N.J.

[21] Appl. No.: 727,043

[22] Filed: Sept. 27, 1976

Related U.S. Application Data

[63] Continuation of Ser. No. 586,879, June 13, 1975.

[51] Int. Cl.$^2$ ................................................ C08L 1/26
[52] U.S. Cl. ........................... 260/17 A; 260/28.5 D; 526/88; 526/200; 526/344; 526/910
[58] Field of Search ...................... 260/17 A, 28.5 D; 526/344, 910, 88, 200

[56] References Cited

U.S. PATENT DOCUMENTS 3,813,373   5/1974   Ito et al. .................................. 526/88

*Primary Examiner*—Lewis T. Jacobs
*Attorney, Agent, or Firm*—H. E. Naylor

[57] ABSTRACT

A high bulk density/low porosity polyvinyl chloride resin which is highly processable and thermally stable is prepared by suspension polymerization wherein a vinyl chloride monomer is polymerized in the presence of: hydroxyethyl cellulose; an internal lubricant-type long chain compound such as butyl stearate; and a water insoluble/monomer soluble initiator such as lauryl peroxide, and wherein the polymerization is performed under low shear conditions in the presence of a minimum amount of oxygen.

10 Claims, No Drawings

PREPARATION OF HIGH BULK DENSITY/LOW POROSITY PVC RESINS

This is a continuation of application Ser. No. 586,879, filed June 13, 1975.

BACKGROUND OF THE INVENTION

Conventional suspension polymerization polyvinyl chloride (herein referred to as PVC) resins have advantageous dry blending properties such as high porosity and low bulk density. However, for processes which require unplasticized extrusion, it is desirable to have a resin with low porosity and high bulk density to assure greater extrusion output rates and less chance of porosity within the product. In the extrusion process, when a high porosity resin is used, air which remains in the resin pores is drawn into the extruder barrel, thus causing porosity in the product.

The instant invention overcomes these problems by producing a product which has low porosity and a high bulk density. This low porosity/high bulk density product is produced by suspension polymerizing vinyl chloride under low shear conditions in the presence of hydroxyethyl cellulose (suspending agent) and an internal lubricant-type compound such as long-chain aliphatic esters in the presence of a minimum amount of oxygen.

The use of internal lubricant-type compounds is not necessary for the production of a high bulk density resin. They are necessary to assure better processing properties of such resins owing to the fact that one of the problems associated with the production of high bulk density PVC is that such resin particles are spherical and glassy. Dry blending these spherical glassy particles with lubricants, processing aids, stabilizers, etc., is difficult, if not impossible, since absorption of these components by such particles is insufficient to form a homogeneous dry blend mixture. The resin begins to thermally decompose at the processing temperature before the additives are uniformly distributed therein. Therefore, the processability as well as the thermal stability of these high bulk density resins are improved by incorporating an internal lubricant-type compound, such as long-chain aliphatic ester into the vinyl chloride during polymerization. That is, each particle or bead of PVC resin contains a small quantity of lubricant; thus facilitating processing.

Addition of lubricants during polymerization is known in the art. For example, U.S. Pat. No. 3,054,786 (Burkholder) teaches the addition of lubricants such as calcium stearate, glyceryl stearate and monoricinoleate during the polymerization process, but only after the desired suspension is effected and prior to discontinuation of polymerization. Burkholder incorporates such lubricants to obtain a high degree of lubricity as well as improving the heat stability of his polymers, but he does not teach the high bulk density resins of the instant invention.

SUMMARY OF THE INVENTION

It has now surprisingly been found that a high bulk density, low porosity PVC resin which is highly processable and thermally stable can be prepared by suspension polymerization. In the present invention, vinyl chloride is polymerized in the presence of hydroxyethyl cellulose (suspending agent); an internal lubricant-type compound such as long-chain aliphatic alcohols, acids and esters, and waxes; and a water insoluble initiator such as lauryl peroxide. The polymerization is performed under low shear conditions in the presence of a minimum amount of oxygen. Such low shear conditions include a relatively low speed of agitation in an unbaffled reactor.

DETAILED DESCRIPTION

The term "PVC" as used in this invention is meant to include both homopolymers of polyvinyl chloride and co-and ter-polymers of vinyl chloride with comonomers such as vinyl acetate, vinyl formate, alkyl vinyl ethers, ethylene, propylene, butylenes, vinylidene chloride, alkyl acrylates and methacrylates, alkyl maleates, alkyl fumarates, etc. Preferably, at least 80%, and more preferably 100% of the monomers to be polymerized will be vinyl chloride monomer. These resins have a number average molecular weight of about 20,000 to about 120,000 and preferably from about 50,000 to about 100,000. Inherent viscosity (as measured by ASTM D1243-60; Method A) will generally be in the range of about 0.4 to about 1.4, preferably in the range of about 0.6 to about 0.9.

Lubricants suitable for use in the instant invention are long chain aliphatic alcohols, acids, esters and waxes which are (a) soluble in the vinyl chloride monomer; (b) insoluble in water; and (c) have the minimum chain length of about 12 carbons for lubrication. By long chain we mean a compound as indicated above, which has from about 12 to about 35 carbon atoms comprising its longest chain and by minimum chain length for lubrication we mean a compound as indicated above which has in its chain at least 12 carbon atoms. More preferred are those aliphatic alcohols, acids, esters and waxes having from about 16 to about 30 carbon atoms in its longest chain. Illustrative of such lubricants are, but not limited to: methyl stearate; propyl palmitate; butyl stearate; hexyl laurate; and epoxy esters such as octyl epoxy stearate; myricyl alcohol; stearyl alcohol; monoglycerides such as glycerol monopalmitate, glycerol monostearate, ethylene glycol myristate; $C_{12}+$ carboxylic acids such as myristic acid, palmitic acid, stearic acid, 12-hydroxy stearic acid and erucic acid; paraffin oils such as $C_{16}$–$C_{18}$ paraffins (white oils); and waxes such as paraffin wax, and glycol esters of montanic acids. Preferred are the esters of $C_{16}$ and $C_{18}$ saturated fatty acids and $C_3$–$C_5$ alcohols, e.g., butyl palmitate and stearate which have low melting points.

Although the lubricant suitable for use in the instant invention may be in solid form, it is preferred that such lubricant be in liquid form at about 40° C. so that it can be added to the vinyl chloride monomer without stirring. If a solid lubricant is used in the instant invention, it should be added as a vinyl chloride concentrate. The lubricant of the instant invention is added so as to incorporate it within each polymer particle, thus assuring sufficient processability of the finished product.

Initiators suitable for use in the instant invention are those conventional PVC initiators which contain about 8 to 16 carbon atoms, are soluble in the vinyl chloride monomer and appreciably insoluble in water. Representative examples of such initiators include, but are not limited to, lauryl peroxide, decyl peroxide, caprylyl peroxide, diisopropyl peroxy dicarbonate, dicyclohexyl peroxy dicarbonate, and dibenzyl peroxy dicarbonate. The initiator may be used in the amount of about 0.01 to about 0.3 parts per 100 parts of monomer.

Suspending agents suitable for use in the instant invention are water soluble polymeric materials having a surface activity of about 20.0 to about 27.0 dynes/cm as measured by the Dynamic Drop Volume Method at a concentration of 0.15 wt. % of agent to water and having a viscosity of about 40 to about 200 cps as measured on a Brookfield viscometer at 30° C at a concentration of 0.5 wt. % of agent to water. Illustrative of such suspending agents would be the hydroxyethyl cellulose-type polymers exhibiting the above properties.

The suspension polymerization of the instant invention is performed in an autoclave reactor with agitation wherein the agitation is produced by a motor driven impeller (agitator). Low shear conditions suitable for use in the instant invention are achieved by a variety of ways depending on the available apparatus which is used to produce the high bulk density/low porosity product of this invention. Although a variety of agitators are available the Pfaudler (retreat curve) type and the Oe (Brumagin) type are generally suitable for use in suspension polymerizations. See R. H. Perry and C. H. Chilton, Chemical Engineers' Handbook, 5th Edition, pp. 19-1 to 19-7, McGraw Hill Publishing Co. (1973). The Pfaudler type agitator generally gives finer polymer particles and poorer particle size distribution than the Oe type. The Oe type agitator gives a good particle size distribution and is best for preparing dry blending (porous) resins. Although such an agitator as the Oe type usually provides high shear, which would normally be unsuitable for use in producing a high bulk density resin, we have found that by removing the baffles of the autoclave reactor the Oe type agitator will give a sufficiently low shear agitation to be suitable for use in this invention. If a low-viscosity liquid is stirred in an unbaffled vessel by an axially mounted agitator, there is a tendency for a swirling flow pattern to develop regardless of the type of impeller used. A vortex is produced owing to the centrifugal force acting on the rotating liquid. Vertical velocities in a vortexing low viscosity liquid are low relative to circumferential velocities in the vessel.

Another factor affecting shear conditions during polymerization is the speed of agitation. Low shear conditions are insured by use of relatively low speeds of agitation. Generally, impeller speeds of about 450 to about 600 rpm (revolutions per minute) are used to produce conventional (low bulk density) resins; in a 600 gallon reactor, it has been found that impeller speeds of about 250 to about 500 rpm are needed to produce the high bulk density resins of the instant invention. It is preferred that about 300 to about 500 rpm be used for producing the resins of the present invention and most preferred is about 350 to about 400 rpm. In fact, in an unbaffled reactor there is a limit to the rotational speed that may be used since the swirling mass of liquid often generates an oscillating surge in the tank, which, coupled with deep vortex, may create a large fluctuating force acting on the mixer shaft. It will be evident to those skilled in the art that the rate of agitation may vary with the grade of PVC resin desired and the volume of the reactor.

Scaling up from a semi-commercial 600 gallon reactor to a commercial size reactor results in only a relatively minor change in the optimum rate of agitation which would be slightly slower in the larger reactor. Suitable rates of agitation may be calculated from the equation relating to reactor diameter, impeller diameter and rotational speed when the reactors are of similar geometry. (G. G. Brown, Unit Operations, p. 506, John Wiley & Sons, Inc., N.Y., 1955).

The products of the instant invention are produced in an enclosed, unbaffled reactor, typically jacketed for heating and cooling, and provided with an agitator (impeller) as indicated previously so as to give low shear agitation. Introduced into such a reactor are: water, hydroxyethyl cellulose, the vinyl chloride monomer, a monomer soluble initiator such as caprylyl peroxide, and an internal lubricant-type compound such as $C_{12}$ to $C_{25}$ aliphatic alcohols, acids, esters and waxes. Generally the suspending agent as a slurry in deionized water is added to the reactor and agitated for about 10 to about 45 minutes in the ratio of about 0.03 to about 0.30 parts by weight of suspending agent per 100 parts of water. After evacuating the reactor, a solution containing the initiator, lubricant and vinyl chloride monomer is introduced into the reactor. The ratios of these ingredients are as follows: about 0.02 to about 0.1 parts of initiator and about 0.1 to about 5 parts of lubricant based on 100 parts of vinyl chloride monomer. Preferred are 0.03 to about 0.07 parts of initiator and about 0.5 to about 2 parts of lubricant based on 100 parts of vinyl chloride monomer. The above ingredients are then heated to about 60° C while agitating at about 375 rpm, until the pressure has fallen to about 80 psig. The agitator speed should be about 250 to about 500 rpm; preferably about 300 to about 500 rpm and most preferably about 350 to about 400 rpm.

The term "high bulk density" as used in the instant specification and claims means a resin having a bulk density in excess of about 0.650 g/ml, for example from about 0.65 to about 0.85 g/ml. Conventional PVC resins usually have a bulk density of about 0.5 to about 0.6 g/ml. The term "high bulk density" as used in the instant invention is also synonymous with the term "high powder density."

By "low porosity resin" we mean a resin having a porosity (or plasticizer acceptance) of less than 15 ml (DOP) per 100 grams of resin under the Porosity Test described herein. A high porosity resin is one having a plasticizer acceptance value above 15 ml as determined by said Porosity Test.

The method used in the instant invention to measure bulk density is as follows:

A 115± 5 cc sample is poured into a funnel which is temporarily closed at its output end. Said funnel is set over a 100 cc cylindrical measuring cup. The output end of the funnel is then opened and the sample is allowed to pour from the funnel into the measuring cup. After the sample has passed through the funnel, thereby overfilling the measuring cup, the top of the measuring cup is scraped with a straight-edge to assure that the measuring cup is filled to its top without excess sample remaining higher than the sides of the cup. The material in the cup is then weighed to the nearest 0.1 g and the weight of material in grams per cc is calculated.

BRABENDER STABILITY TEST

The Brabender Heat Stability Test used to determine the long range processing stability of the instant PVC compounds was performed on a Brabender torque rheometer fitted with a 30 ml roller head (5/2) and a 5 kg ram weight. A Moseley Autograf Model 7101B recorder was used to continuously monitor the temperature.

The Brabender conditions were as follows:
Head Temperature; 350° F
Sensitivity; 5:1
Zero Suppression; to keep pen on scale Damping at X 1; 15 secs. (1000-100 mg)
Rotor Speed; 35 and 143 rpm
Scale; X 5
Sample Charge Weight; 22 g The Brabender was set at 35 rpm and 22 grams of PVC compound was charged through a cooled chute wherein the ram weight was applied. When the ram weight reached bottom, the Brabender and Moseley charts were simultaneously started. One minute after fusion occurred, the rotor speed was increased from its original speed of 35 rpm to 143 rpm as quickly as possible. When the torque rose 100 meter grams, the test was discontinued.

POROSITY TEST

Porosity of the PVC resins of the instant invention was measured by determining the quantity of dioctyl phthalate (plasticizer) absorbed by the pores of said resins. The procedure was as follows: void spaces in a bed of (Grade 20/30) sand were determined by placing 25 cc of said sand into a 50 ml centrifuge tube. A measured quantity (1 to 6 ml) of dioctyl phthalate (DOP) were then added to each tube and centrifuged for 15 minutes at 3000 rpm. The saturation level was noted and a plot of DOP versus saturation level made. A 30 g sample of resin was then mixed with 12 g of DOP at room temperature and 20 g sample of same was placed in a 50 ml centrifuge tube containing 25 cc of Grade 20/30 sand. The samples were centrifuged for about 20 minutes at 3000 rpm and the quantity of plasticizer absorbed by the resin is determined by first measuring the amount of excess plasticizer that drains to the sand level, then acquiring the amount of plasticizer corresponding to said saturation level from the aforementioned graph. The porosity or plasticizer acceptance in parts per hundred based on total parts of resin is then calculated by straightforward arithmetic which would be obvious to those skilled in the art.

The instant invention will be further understood by reference to the following description and examples.

EXAMPLES 1 and 2

Experiments 1 and 2 were performed acccording to the following procedure except that the autoclave used in Example 1 contained baffles and the autoclave used in Example 2 was the same as that used in Example 1 except for removal of the baffles.

A 600 gallon stainless steel pressure autoclave equipped with an Oe (Brumagin) type mechanical agitator and a jacket for heating and cooling was charged with 3000 lb of deionized water to which 2.49 lb of hydroxyethyl cellulose was slurried and agitated at a speed of 400 rpm for 30 minutes. The autoclave was then pressure tested and evacuated for 25 minutes at 60-70 mm of Hg. The agitator was stopped and 708 g of 50% (w/w) caprylyl peroxide-toluene solution was added followed by 1560 lb of vinyl chloride. Agitation was again commenced and the mixture heated to 140° F and maintained at this temperature and rate of agitation until the reaction pressure of 135 psig had fallen to 60 psig (approx. 12 hours); the product was recovered, dried and particle size and bulk densities were measured. Table I contains the results of these measurements.

TABLE I

|  | Example 1 (with baffles) | Example 2 (w/o baffles) |
| --- | --- | --- |
| median particle size, mm | 0.060 | 0.085 |
| bulk density, g/ml | 0.64 | 0.71 |

These Examples show that removal of baffles from the autoclave results in an increase in resin particle size and favors the production of resins with a higher bulk density than those produced in the autoclave containing baffles. Although the resin produced in Example 1 was relatively high in bulk density, it was very low in particle size and therefore not acceptable.

EXAMPLE 3

A 600 gallon stainless steel baffleless autoclave equipped with an Oe (Brumagin) type agitator (impeller) and a jacket for heating and cooling was charged with 3000 lbs of deionized water. A slurry of 2.31 lb of hydroxyethyl cellulose and 300 lbs of water was introduced and agitated at 400 rpm for 30 minutes, during which time the autoclave was pressure tested and evacuated for about 25 minutes at a pressure of 60-70 mm at Hg. The agitator was stopped and a solution containing 354 g of caprylyl peroxide dissolved in 23.4 lb of butyl stearate was introduced followed by 1560 lbs of vinyl chloride. The agitation was commenced and the mixture was heated to about 60° C and maintained at this temperature until the reaction pressure of about 135 psig had fallen to about 60 psig (approx. 14 hours). The resin was recovered, dried and had a medium particle size of 0.078 mm, a number average molecular weight of 70,000, a porosity or plasticizer acceptance of 7 ml/100 g and a bulk density of 0.71 g/ml.

EXAMPLE 4

The procedure of Example 3 was followed except that butyl stearate was eliminated from the process. This experiment produced a high bulk density product without the presence of an internal lubricant.

EXAMPLE 5

In this Example, the internal-lubricant containing high bulk density resin of Example 3, the high bulk density resin without internal-lubricant of Example 4 and a conventional low bulk density resin were separately extruded in a Schwabenthan Extruder for the purpose of comparing the extrusion performance of each. Table II sets forth the particle size, porosity and bulk density of each and Table III sets forth the extrusion performance of each.

TABLE II

|  | Conventional LBD Resin | HBD Resin of Ex. 4 (w/o Lubricant) | HBD Resin of Ex. 3 (w/Lubricant) |
| --- | --- | --- | --- |
| Median Particle Size, mm | 0.116 | 0.078 | 0.080 |
| Bulk Density, g/ml | 0.53 | 0.71 | 0.71 |
| Porosity phr (amount of plasticizer absorbed by resin) | 25 | 7 | 8 |

TABLE III
PERFORMANCE OF HBD & LBD PVC

| | Torque | Power | Extrusion Output | Back Pressure |
|---|---|---|---|---|
| Conventional LBD Resin (control run) | 100 | 100 | 100 | 100 |
| HBD Resin of Ex. 4 No Internal Lubricant | 117 | 104 | 110 | 100 |
| HBD Resin of Ex. 3 With Internal Lubricant | 83 | 98 | 104 | 81 |

The data of Table III clearly indicate that the HBD resin containing the internal lubricant is superior for extrusion purposes over both the conventional LBD resin and the HBD resin w/o the internal lubricant. Table III also shows that the extrusion output rate increases approximately 10% when a HBD resin w/o internal lubricant is used as opposed to the use of a conventional LBD resin.

What is claimed is:

1. A polyvinyl chloride resin having a bulk density in excess of 0.65 g/ml, a porosity or plasticizer acceptance less than about 15 ml per 100g resin, a median particle size of about 0.01 to about 0.3 mm, wherein each resin particle consists essentially of polyvinyl chloride and a $C_{12}$-$C_{35}$ aliphatic compound selected from the group consisting of alcohols, acids, esters and waxes.

2. The resin of claim 1 wherein the aliphatic compound is selected from the group consisting of $C_3$-$C_5$ alkyl stearates and palmitates.

3. The resin of claim 1 wherein the aliphatic compound contains about 16 to about 30 carbon atoms in its longest chain.

4. The resin of claim 3 wherein the porosity is about 5 to about 15 ml per 100 g resin.

5. The resin of claim 4 wherein the bulk density is about 0.65 to about 0.85 g/ml.

6. The resin of claim 1 wherein the aliphatic compound is a liquid at about 40° C.

7. The resin of claim 5 wherein the aliphatic compound is a liquid at about 40° C.

8. A method of producing a high bulk density/low porosity polyvinyl chloride resin which comprises suspension polymerizing vinyl chloride in the presence of about 0.1 to about 5 parts of $C_{12}$-$C_{35}$ aliphatic alcohol, aliphatic acid, aliphatic ester or wax, a monomer soluble/water insoluble initiator and about 0.02 to about 0.5 parts of hydroxyethyl cellulose wherein said parts are based on 100 parts of vinyl chloride monomer and wherein said polymerization is performed in an unbaffled reactor under low shear conditions.

9. The method of claim 8 wherein the amount of aliphatic compound used is 0.1 to about 5 parts per 100 parts of monomer.

10. The method of claim 8 wherein the amount of initiator used is about 0.01 to about 0.3 parts per 100 parts of monomer.

* * * * *